United States Patent [19]
Cole

[11] 3,780,707

[45] Dec. 25, 1973

[54] STRATIFIED CHARGE ROTARY COMBUSTION ENGINE

[75] Inventor: Edward N. Cole, Bloomfield Hills, Mich.

[73] Assignee: General Motors Corporation, Detroit, Mich.

[22] Filed: May 1, 1972

[21] Appl. No.: 248,864

[52] U.S. Cl.............................. 123/8.13, 123/8.45
[51] Int. Cl.................................................. F02b 53/04
[58] Field of Search................ 123/8.13, 8.01, 8.05, 123/8.45

[56] References Cited
UNITED STATES PATENTS
3,097,632  7/1963  Froede et al...................... 123/8.05

Primary Examiner—Carlton R. Croyle
Assistant Examiner—Michael Koczo, Jr.
Attorney—J. L. Carpenter et al.

[57] ABSTRACT

A rotary combustion engine having an intake arrangement providing a controlled peripheral variation in the air-fuel mixture in each working chamber to effect a trailing rich air-fuel region for ignition and a leading lean air-fuel region for continuing combustion.

8 Claims, 9 Drawing Figures

STRATIFIED CHARGE ROTARY COMBUSTION ENGINE

This invention relates to rotary combustion engines and more particularly to rotary combustion engines with stratified charging.

In rotary combustion engines, stratification of the charge has been proposed to reduce the incomplete CO and HC products of combustion and also reduce NO production. While there has been substantial work in this area in reciprocating piston engines, the stratified charge apparatus that has resulted does not readily lend itself to incorporation in present commercial rotary combustion engines mainly because of the basic differences in structure of these two types of engines. For example, it is common practice to provide stratified charging in reciprocating piston engines by fuel injection into precombustion chambers, there thus being provided a rich air-fuel region in this chamber for initiating combustion and a lean air-fuel mixture in the connected combustion chamber for continued combustion. Up to this time, stratified charging in rotary combustion engines has mainly centered on the use of high pressure fuel injection rather than low pressure fuel injection or some form of carburetion. One example of a stratified charge rotary combustion using high pressure injection with separated zones of rich air-fuel mixture for ignition and lean air-fuel mixture for continued combustion is disclosed in copending U.S. Pat. application Ser. No. 144,728, now U.S. Pat. No. 3,699,929, entitled "Rotary Combustion Engine" by James E. Bennethum and assigned to the assignee of the present invention.

According to the present invention there is provided a rotary combustion engine having an intake arrangement providing a stratified charge that may be effected with either carburetion or low pressure injection. In the intake arrangement there are provided at least two separate intake ports to the rotor cavity which are connected to receive air and fuel in different proportions and are arranged relative to the path of rotor motion so that one intake port remains open longer than the other during the intake phase to provide a controlled peripheral variation of the air-fuel mixture applied to each working chamber so that in the vicinity of top-dead-center there is a rich air-fuel mixture in the trailing region of the working chamber and a lean air-fuel mixture in the leading region. An igniter is arranged to ignite the rich air-fuel mixture with combustion then proceeding toward the lean mixture. The rich air-fuel mixture ignited is determined to limit the temperature to a value conducive to low NO production and the incomplete products of this phase of combustion, namely CO and HC, are passed into the lean air-fuel mixture which is determined to be conducive to reduce these products to low levels. To enhance the extent combustion takes place with the rich and lean air-fuel regions, the rotor chamber faces are contoured to physically separate each working chamber into two peripherally spaced regions encompassing these two mixture regions at the initiation of combustion.

An object of the present invention is to provide a rotary combustion engine having new and improved stratified charging.

Another object is to provide in a rotary combustion engine stratified charging by controlled peripheral variation in the air-fuel mixture in each working chamber during the intake phase effected by multiple intake port opening timing.

Another object is to provide in a rotary combustion engine an intake arrangement having separate intake passages with different chamber opening intervals for delivering different amounts of air and fuel to different regions of each working chamber during the intake phase to provide a controlled peripheral variation in the air-fuel mixture therein.

Another object is to provide in a rotary combustion engine an intake arrangement providing a peripheral variation in air-fuel mixture in each working chamber during the intake phase by multiple intake port opening timing to effect a trailing rich air-fuel mixture for initiating combustion and a leading lean air-fuel mixture for continued combustion.

Another object is to provide in a rotary combustion engine an intake arrangement having separate intake passages with different air and fuel supply disposed relative to rotor motion to be open for different time intervals to effect a peripheral variation of the air-fuel mixture in each working chamber wherein there is a trailing rich air-fuel mixture that is initially ignited with combustion then proceeding to a leading lean air-fuel mixture.

These and other objects of the present invention will become more apparent from the following description and drawing in which.

Figure 1:
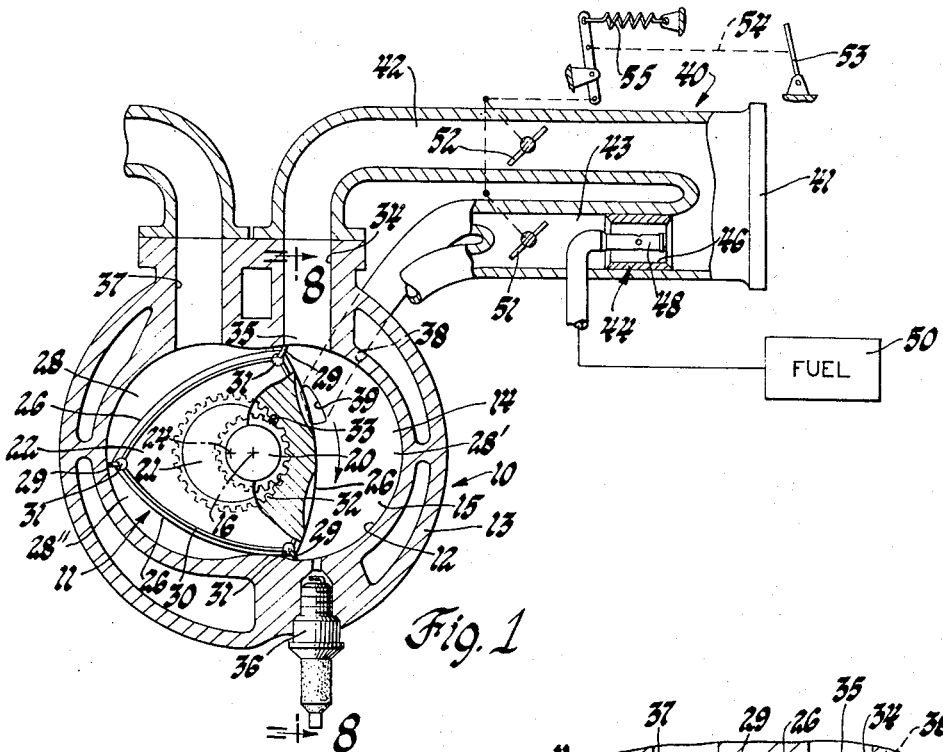
FIG. 1 is a transverse sectional view of a rotary combustion engine with a stratified charge intake arrangement according to the present invention.

Referring to FIG. 1, the invention is illustrated for use in a rotary combustion engine of the Wankel type comprising a stationary outer body or housing 10. The housing 10 has a rotor cavity 11 that is defined by an inwardly facing peripheral wall 12 of a rotor housing 13 and a pair of axially spaced end walls 14 of end housings 15 of which only one is shown. The peripheral wall 12 is in the shape of a two-lobed epitrochoid or a curve parallel thereto whose center or axis is indicated at 16 where the curve's minor axis and major axis intersect. A power output shaft 20 extends through the cavity 11 and is rotatably supported by the housing 10 in the end housings 15 so that the shaft's axis is coincident with the axis 16 of the peripheral wall 12.

The power output shaft 20 is provided in the cavity 11 with an eccentric 21 on which a rotor 22 is mounted for rotation about the eccentric's axis 24, this axis being spaced from and parallel to the power output shaft's axis 16. The rotor 22 has the general shape of a triangle with three peripheral faces 26 which face the peripheral wall 12 and cooperate therewith and with the end walls 14 to define three variable volume combustion or working chambers 28, 28' and 28''. An axially extending apex seal 29 is mounted at each apex or corner of the rotor 22 and in each rotor side there is mounted a side seal 30 extending between each set of adjacent apex seals 29 with an intermediate button seal 31 at each apex providing a sealing link between adjacent side and apex seals. The apex seals 29 continuously engage the peripheral wall 12 and both the side seals 30 and button seals 31 engage the end walls 14 with the complete seal arrangement acting to seal the chambers as the rotor rotates. With the two-lobed peripheral wall 12 and the three-lobed rotor 22 there are provided the four phases of intake, compression, expansion and exhaust in each chamber in fixed relation to the housing for each turn of the rotor by forcing the rotor to rotate at one-third the speed of the output shaft. This is accomplished by a gear train comprising an internally toothed ring gear 32 that is fixed to the rotor 22 concentric with the rotor axis 24. Ring gear 32 meshes with an externally toothed gear 33 which is concentric with the power output shaft 20 and is made stationary by being fixed to the engine housing 10. The ring gear 32 has one and one-half times the number of teeth as the gear 33 to provide the required ratio of 3:1 between the power output shaft 20 and the rotor 22.

Figure 6:
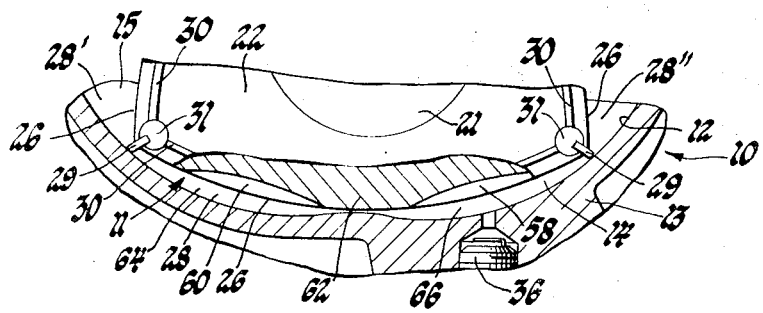
Figure 7:
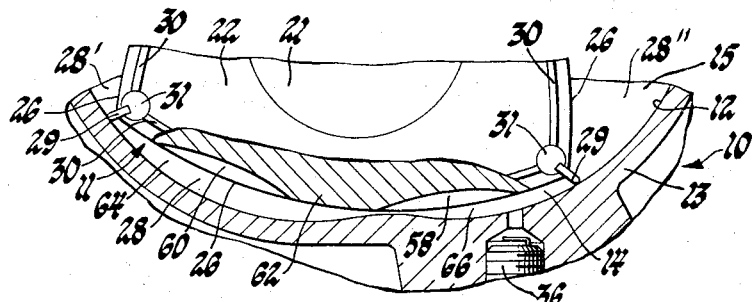

Assuming this was a normally carbureted rotary engine, air-fuel mixture is normally made available to each working chamber by an intake passage 34 that extends through the housing 10 such as through the rotor housing 13 and terminates in a peripheral port 35 in wall 12 open to the rotor cavity 11. Assuming there is air-fuel mixture made available to the intake passage 34, as each apex seal 29 traverses the intake port 35 on rotor rotation in the direction of the arrow in FIG. 1, the inlet port is opened to the working chamber trailing this apex seal and the mixture is then drawn into this chamber until the intake port is closed to this chamber by the trailing apex seal with continued rotor rotation. The mixture then trapped in the working chamber is compressed and when the rotor is at top-dead-center (TDC) as shown in FIG. 6 or in the vicinity thereof, ignition of the mixture is effected by a spark plug 36 mounted in the rotor housing 13 as shown. The peripheral wall 12 takes the reaction forcing the rotor to continue rotation while the gas is expanding. Eventually the leading apex seal of this chamber passes an exhaust passage 37 open to rotor cavity 11 as shown in FIG. 1 so that the burned gas mixture in this working chamber is then expelled to the atmosphere to complete the cycle. Thus, with the single rotor and each of the three working chambers undergoing intake, compression, expansion and exhaust, there is provided a power phase for each revolution of the engine's output shaft.

Assuming the intake passage 34 is for delivering the only air-fuel mixture available to the engine and is the only provision for such admission, the engine construction thus far described is conventional. With such an intake arrangement there results a peripheral variation in the air-fuel mixture in each working chamber with the richness increasing in the direction of the trailing end of the chamber. This result is believed to be in part due to the inertia of the heavier fuel particles in the mixture, it having been observed that the variation becomes more pronounced with the mixture becoming richer near the trailing region of the working chamber as the rotor speed increases. As a result it is difficult to maintain highly efficient combustion and correspondingly very low emission levels throughout the engine's speed range.

According to the present invention there is provided an intake arrangement for effecting a stratified charge by controlled peripheral variation of the air-fuel mixture in each working chamber prior to initiation of combustion. In one embodiment shown in FIG. 1 there is included the intake passage 34 and in addition there is provided a pair of intake passages 38 which extend through the end housings 15 and terminate in axially aligned inlet ports 39 in the end walls 14. The end housing inlet ports 39 are arranged relative to the path of the rotor 22 so that as the rotor 22 rotates, they are opened to each working chamber subsequent to the opening of the peripheral intake port 35 thereto and then close therewith as will be described in more detail later. An intake manifold 40 is secured to the engine housing 10 and has an atmospheric air inlet end 41 open to a passage 42 which is connected to the intake passage 34. The air inlet end 41 is also open to another passage 43 having branches which are connected to the other intake passages 38. In the intake passage 43 there is incorporated a carburetor 44 having a venturi 46 in which is located a fuel nozzle 48 that is connected to be supplied with fuel from a fuel source 50 as schematically shown. A pivotal throttle valve 51 is provided in the passage 43 immediately downstream of the venturi section and in the other passage 42 there is provided a pivotal air valve 52. The two valves 52 and 51 are linked to each other and to an accelerator pedal 53 by linkage 54 as shown so that the vehicle operator by depressing the pedal 53 opens both these valves simultaneously against the bias of a return spring 55.

Figure 2:
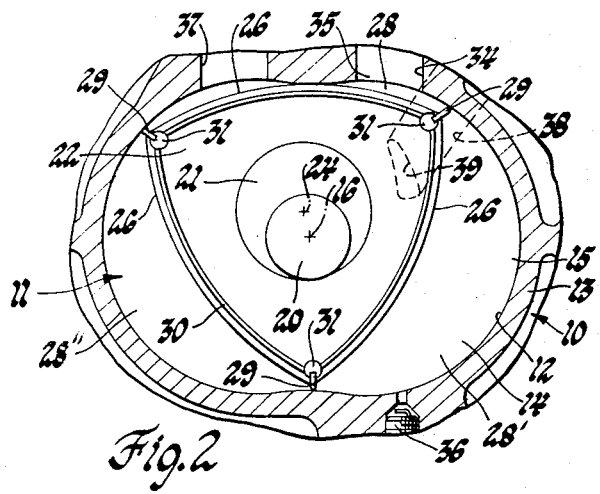
FIGS. 2 through 7 are partial enlarged views of the engine and together with FIG. 1 illustrate the sequence of events that takes place as one of the chambers goes from exhaust to combustion.
Figure 3:
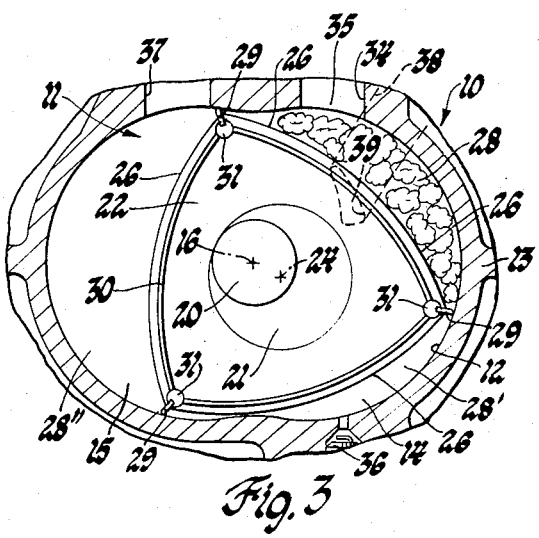
Figure 4:
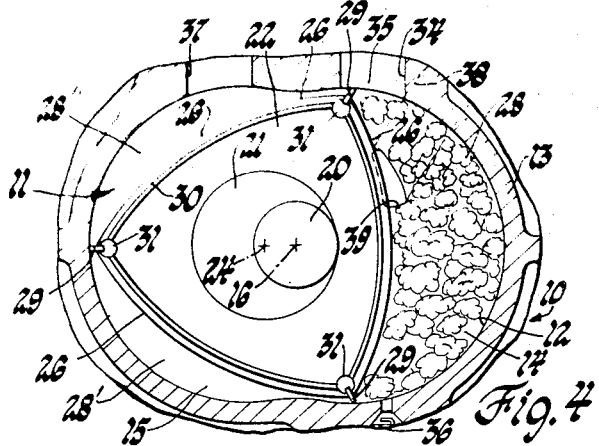
Figure 5:
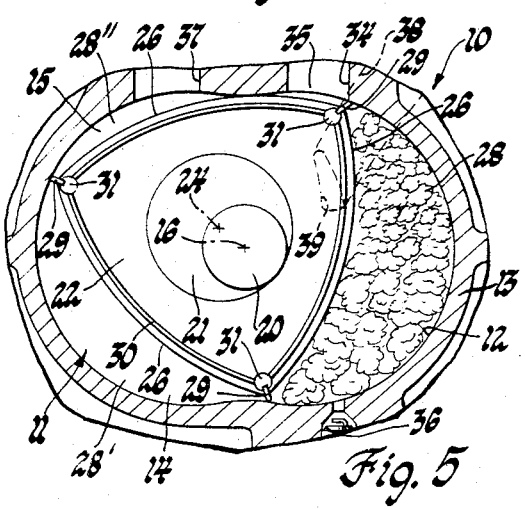

Describing now the operation of the engine with the intake arrangement according to the present invention, reference is made to FIGS. 1 through 7 which show the sequence of engine events that takes place as one of the working chambers 28 moves with rotor 22 from exhaust to combustion. In FIG. 1, the rotor 22 is shown driving the spent gases out from chamber 28 into the exhaust passage 37 with this chamber just about to open to the air intake port 35. With both the air valve 52 and the throttle valve 51 partially open and on further rotor rotation as shown in FIG. 2, the leading apex seal passes air intake port 35 to then allow air to be drawn into chamber 28 while the air-fuel ports 39 remain closed by the sides of the rotor 22. This intake of only air continues to the rotor position shown in FIG. 3 by which time there has been effected substantial filling of chamber 28 with air via the air intake port 35 and only then are the air-fuel intake ports 39 about to be uncovered to chamber 28 by rotor 22. Then on continuing rotation of the rotor the air-fuel intake ports 39 are uncovered as the side seals 30 traverse these ports to then admit air-fuel mixture to chamber 28 with the inlet ports not being fully uncovered until the rotor has moved to the position shown in FIG. 4, the inlet ports 39 being gradually opened wider between the FIG. 3 and FIG. 4 rotor positions. The air-fuel mixture mixes with the previously admitted air and with the air that is being drawn in simultaneously therewith to provide a peripheral variation other than by inertia effect wherein the air-fuel mixture in chamber 28 varies from a lean mixture in the leading region of the chamber to a rich mixture in the trailing region. When the rotor reaches the position shown in FIG. 5, the trailing apex seal has passed the air intake port 35 and the side seals have at the same time passed the air-fuel intake ports 39 so that the chamber 28 is now closed for compression on further rotor rotation. The spark plug 36 is arranged so that when the rotor 22 is in the vicinity of its top-dead-center position for chamber 28 as shown in FIG. 6, its spark ignites the rich trailing portion of the mixture whereafter the flame front then proceeds forwardly into the progressively leaner leading mixture.

To enhance the extent that combustion takes place with such peripheral air-fuel mixture variation, each of the rotor faces 26 instead of having the normal channel for spanning the cusp of the epitrochoid at top-dead-center, is provided with a pair of peripherally spaced cavities or depressions 58 and 60 separated by a wall section 62. The cavity 60 leads the other cavity 58 and therefore these cavities may be referred to as the leading cavity and the trailing cavity, respectively. When the rotor is in its top-dead-center position shown in FIG. 6, the working chamber 28 is effectively physically separated by wall section 62 and the cusp of wall 12 into a leading chamber region 64 containing lean air-fuel mixture and a trailing chamber region 66 containing rich air-fuel mixture. The spark plug 36 ignites the air-fuel mixture that is in the trailing chamber region 66 between the rotor positions shown in FIGS. 6 and 7 and with sufficient advance to assure substantial completion of burning near the wall section 62 before the rotor reaches the position shown in FIG. 7 at which time the trailing chamber region 66 is then open past the cusp of wall 12 to the leading chamber region 64. Then the products of combustion move into the lean air-fuel mixture in the leading chamber region 64 where combustion of the unburned products continues toward completion.

Figure 8:
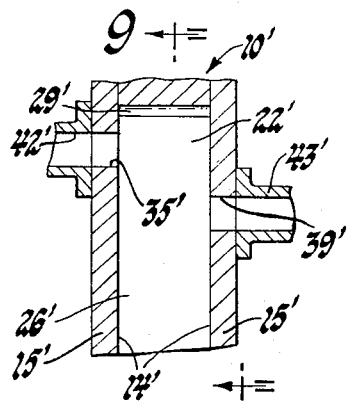
FIG. 8 is a partial cross-sectional view of a modification of the intake arrangement shown in FIG. 1.
Figure 9:
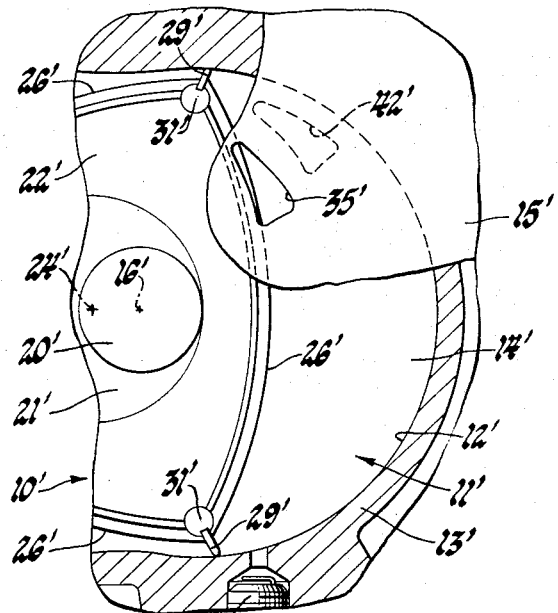
FIG. 9 is a view taken on the line 9—9 in FIG. 8.

Another embodiment of the present invention is shown in FIGS. 8 and 9 where parts similar to those shown in FIGS. 1 through 7 are identified by the same numerals only primed. In the FIG. 8 and 9 embodiment, there is provided only one air-fuel intake port 39' and the air intake port 35' instead of being located in the peripheral wall 12' is located in the opposite end wall 14' generally axially opposite the air-fuel intake port 39'. The air intake port 35' is arranged relative to the rotor path so that it remains open to each working chamber from the beginning to the end of the intake phase while the air-fuel intake port 39' is open to each working chamber only through the latter portion of the intake phase as before, the advantage of this arrangement being that the size of the air intake port 35' can be made greater than that of the peripheral intake port 35 in the former embodiment without increasing the overlap between exhaust and intake. Otherwise the FIG. 8 and 9 embodiment operates the same as that described previously for the FIG. 1 – 7 embodiment.

Thus it can be seen that in both arrangements there is provided a controlled peripheral variation in the air-fuel mixture in each working chamber prior to combustion with such mixture becoming increasingly richer in the direction of the trailing end of the chamber. Furthermore, it will be clear to those skilled in the art that the air valve and throttle valve can be operated in a certain opening relationship or independently of each other to obtain the optimum peripheral air/fuel ratio variation for combustion in a particular application and for a certain speed. In the arrangements shown this is effected by air being drawn in throughout the intake phase and air-fuel mixture being drawn in through only the latter part of this phase. It is also contemplated that instead of just air being introduced by the air intake port, there may be provided carburetion making available a lean air-fuel mixture to the intake porting that is open throughout the intake phase while making available a rich mixture to the intake porting that is open only during the latter portion of the intake phase.

The above described embodiments are illustrative of the invention which may be modified within the scope of the appended claims.

I claim:

1. A rotary combustion engine comprising a housing having a cavity, a rotor disposed in said cavity, an output shaft rotatably supported in said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are spaced around and move with said rotor within said housing and vary in volume as said rotor planetates, air and fuel supply means including intake passage means periodically opened to said working chambers by traversing motion of said rotor as said rotor planetates, exhaust passage means periodically opened to said working chambers by traversing motion of said rotor as said rotor planetates, and said intake passage means including a pair of intake ports, one of said intake ports introducing a relatively lean air-fuel mixture, the other of said intake ports introducing a relatively rich air-fuel mixture, said intake ports open to said cavity and disposed relative to each other and the traversing path of said rotor so that said one intake port is opened to each working chamber longer than the opening of said other intake port thereto to effect an air-fuel mixture in each working chamber that varies from lean to rich in a peripheral direction.

2. A rotary combustion engine comprising a housing having a cavity, a rotor disposed in said cavity, an output shaft rotatably supported in said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are spaced around and move with said rotor within said housing and vary in volume as said rotor planetates, air and fuel supply means including intake passage means periodically opened to said working chambers by traversing motion of said rotor as said rotor planetates, exhaust passage means periodically opened to said working chambers by traversing motion of said rotor as said rotor planetates, and said intake passage means including a pair of intake ports, one of said intake ports introducing a relatively lean air-fuel mixture, the other of said intake ports introducing a relatively rich air-fuel mixture, said intake ports open to said cavity and disposed relative to each other and the traversing path of said rotor so that said one intake port is opened to each working chamber throughout an intake phase and said other intake port is opened to each working chamber through only a latter portion of the intake phase to effect an air-fuel mixture in each working chamber having an air-fuel ratio that varies in a peripheral direction.

3. A rotary combustion engine comprising a housing having a cavity, a rotor disposed in said cavity, an output shaft rotatably supported in said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are spaced around and move with said rotor within said housing and vary in volume as said rotor planetates, air and fuel supply means including intake passage means periodically opened to said working chambers by traversing motion of said rotor as said rotor planetates, exhaust passage means periodically opened to said working chambers by traversing motion of said rotor as said rotor planetates, and said intake passage means including a pair of intake ports, one of said intake ports introducing a relatively lean air-fuel mixture, the other of said intake ports introducing a relatively rich air-fuel mixture, said intake ports open to said cavity and arranged relative to each other and the path of said rotor so that said one intake port is opened to each working chamber throughout an intake phase and said other intake port is opened to each working chamber only during a latter portion of the intake phase to effect in each working chamber an air-fuel mixture that is lean in a leading chamber region and rich in a trailing chamber region.

4. A rotary combustion engine comprising a housing having a cavity, a rotor disposed in said cavity having a plurality of peripheral faces, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are peripherally spaced around and move with said rotor within said housing and that vary between a minimum volume and a maximum volume as said rotor planetates, each said rotor face having a contour for cooperating with said housing to divide each said working chamber when at minimum volume into separate regions with a flow restriction therebetween and wherein one chamber region leads the other chamber region as said rotor planetates, exhaust passage means periodically opened to said working chambers by traversing motion of said rotor as said rotor planetates, air intake passage means including an air intake port open to said cavity in a position to be periodically opened by said rotor to admit only air to each said working chamber during an intake phase when said regions are not separated by said flow restriction, air-fuel intake passage means including an air-fuel intake port open to said cavity in a position to be periodically opened by said rotor to admit air and fuel to each said working chamber through a latter portion of the intake phase subsequent to the opening of said air intake port thereto and when said regions are not separated by said flow restriction so that when each said working chamber approaches minimum volume and are separated by said flow restriction there is a rich air-fuel mixture in the trailing chamber region in comparison with the air-fuel mixture in the leading chamber region, and ignition means for igniting the rich air-fuel mixture in each said working chamber in the trailing chamber region when said regions are separated by said flow restriction whereby combustion is initiated in the trailing chamber region and on continued rotor planetation and removal of said flow restriction combustion is continued into the leading chamber region.

5. A rotary combustion engine comprising a housing having a cavity, a rotor disposed in said cavity having a plurality of peripheral faces, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are peripherally spaced around and move with said rotor within said housing and that vary between a minimum volume and a maximum volume as said rotor planetates, each said rotor face having a contour for cooperating with said housing to divide each said working chamber when at minimum volume into separate regions with a flow restriction therebetween and wherein one chamber region leads the other chamber region as said rotor planetates, exhaust passage means periodically opened to said working chambers by traversing motion of said rotor as said rotor planetates, air and fuel intake passage means including a first intake port open to said cavity at a location to be periodically open to each said working chamber by traversing of said rotor as said rotor planetates and a second intake port open to said cavity at a location to be periodically opened to each said working chamber subsequent to opening of said first intake port thereto and to close with said first intake port by traversing of said rotor as said rotor planetates, said air and fuel supply means including air and fuel control means for providing different proportions of air and fuel to said intake ports to effect an air-fuel mixture in the trailing chamber region that is rich in comparison with the air-fuel mixture in the leading chamber region, and ignition means for igniting the rich air-fuel mixture in each said working chamber in the trailing chamber region when said regions are separated by said flow restriction whereby combustion is initiated in the trailing chamber region and on continued rotor planetation and removal of said flow restriction combustion is continued into the leading chamber region.

6. A rotary combustion engine comprising a housing having a cavity, a rotor disposed in said cavity, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are peripherally spaced around and move with said rotor within said housing and that vary in volume as said rotor planetates, a first intake passage having an intake port open to said cavity and arranged to be periodically opened to said working chambers by traversing motion of said rotor as said rotor planetates, a second intake passage having an intake port open to said cavity and arranged to be periodically opened to said working chambers by traversing motion of said rotor as said rotor planetates, an exhaust passage open to said cavity and arranged to be periodically opened to said working chambers by traversing motion of said rotor as said rotor planetates, air and fuel supply means for supplying air and fuel in different proportions to said intake passages, and said intake ports arranged relative to each other and the traversing path of said rotor so that one of said intake ports is opened to each said working chamber longer than the opening of the other intake port thereto to effect an air-fuel mixture in the working chamber whose air/fuel ratio varies peripherally.

7. A rotary combustion engine comprising a housing having a peripheral wall and a pair of opposed end walls defining a cavity, a rotor disposed in said cavity, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are peripherally spaced around and move with said rotor within said housing and that vary in volume as said rotor planetates, a first intake passage having an intake port in said peripheral wall open to said cavity and arranged to be periodically opened to said working chambers by traversing motion of said rotor as said rotor planetates, a second intake passage having an intake port in one of said end walls open to said cavity and arranged to be periodically opened to said working chambers by traversing motion of said rotor as said rotor planetates, an exhaust passage open to said cavity and arranged to be periodically opened to said working chambers by traversing motion of said rotor as said rotor planetates, air and fuel supply means for supplying air and fuel in different proportions to said intake passages, and said intake ports arranged relative to each other and the traversing path of said rotor so that one of said intake ports is opened to each said working chamber longer than the opening of the other intake port thereto to effect an air-fuel mixture in the working chamber whose air/fuel ratio varies peripherally.

8. A rotary combustion engine comprising a housing having a peripheral wall and a pair of opposed end walls defining a cavity, a rotor disposed in said cavity, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor and said housing cooperatively providing a plurality of working chambers that are peripherally spaced around and move with said rotor within said housing and that vary in volume as said rotor planetates, a first intake passage having an inlet port in one of said end walls open to said cavity and arranged to be periodically opened to said working chambers by traversing motion of said rotor as said rotor planetates, a second intake passage having an intake port in the other of said end walls open to said cavity and arranged to be periodically opened to said working chambers by traversing motion of said rotor as said rotor planetates, an exhaust passage open to said cavity and arranged to be periodically open to said working chambers by traversing motion of said rotor as said rotor planetates, air and fuel supply means for supplying air and fuel in different proportions to said intake passages, and said intake ports arranged relative to each other and the traversing path of said rotor so that one of said intake ports is opened to each said working chamber longer than the opening of the other intake port thereto to effect an air-fuel mixture in the working chamber whose air/fuel ratio varies peripherally.

* * * * *